US009369835B2

(12) United States Patent
Palanki et al.

(10) Patent No.: US 9,369,835 B2
(45) Date of Patent: Jun. 14, 2016

(54) METHOD AND APPARATUS FOR ENHANCING ACCESS POINT DATABASES

(71) Applicant: QUALCOMM Incorporated, San Diego, CA (US)

(72) Inventors: Ravi Palanki, Cupertino, CA (US); Ayman Fawzy Naguib, Cupertino, CA (US); Ashok Bhatia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 14/035,597

(22) Filed: Sep. 24, 2013

(65) Prior Publication Data

US 2015/0087238 A1  Mar. 26, 2015

(51) Int. Cl.
*H04W 4/00*  (2009.01)
*H04W 4/02*  (2009.01)
*G01S 5/02*  (2010.01)

(52) U.S. Cl.
CPC .............. *H04W 4/02* (2013.01); *G01S 5/0242* (2013.01)

(58) Field of Classification Search
CPC ............................. H04W 4/023; H04W 4/025
USPC ........................................... 455/414.2, 456.1
See application file for complete search history.

(56) References Cited

U.S. PATENT DOCUMENTS

| 6,459,989 | B1 * | 10/2002 | Kirkpatrick et al. | .......... 701/470 |
| 7,640,026 | B2 | 12/2009 | Cameron et al. | |
| 8,219,112 | B1 * | 7/2012 | Youssef et al. | ............. 455/456.1 |
| 2010/0291949 | A1 | 11/2010 | Shapira et al. | |
| 2011/0018732 | A1 * | 1/2011 | Cho et al. | ................. 340/825.49 |
| 2011/0103360 | A1 | 5/2011 | Ku et al. | |
| 2011/0170524 | A1 | 7/2011 | Arslan et al. | |
| 2012/0122475 | A1 | 5/2012 | Ahmed et al. | |
| 2012/0133555 | A1 | 5/2012 | Hyun | |
| 2014/0073363 | A1 * | 3/2014 | Tidd et al. | .................. 455/456.5 |
| 2014/0211691 | A1 * | 7/2014 | Emadzadeh et al. | .......... 370/328 |
| 2014/0278054 | A1 * | 9/2014 | Tidd et al. | ..................... 701/409 |
| 2014/0341198 | A1 * | 11/2014 | Han | .............................. 370/338 |

FOREIGN PATENT DOCUMENTS

| AU | 2011201767 A1 | 5/2011 |
| WO | 2006031035 A1 | 3/2006 |

OTHER PUBLICATIONS

International Search Report and Written Opinion—PCT/US2014/052176—ISA/EPO—Nov. 19, 2014.

\* cited by examiner

*Primary Examiner* — Wen Huang
(74) *Attorney, Agent, or Firm* — Silicon Valley Patent Group LLP

(57) ABSTRACT

An estimated location of an access point is generated based on identification of indoor and outdoor locations and the presumption that most access points are in an indoor location. The estimated location may be produced using location information for the access point and the identification of the indoor and outdoor locations while prioritizing the indoor location to produce the estimated location on or within a boundary of the indoor location. The location information may be, e.g., a preliminary estimated location or wireless signal measurements and associated position fixes for the access point. For example, a preliminary estimated location may be shifted to be on or within the nearest boundary of an indoor location or may be adjusted based on the location information. The estimated location may be calculated directly using weights to bias the calculation of the estimated location to be on or within the boundary of the indoor location.

38 Claims, 6 Drawing Sheets

METHOD AND APPARATUS FOR ENHANCING ACCESS POINT DATABASES

BACKGROUND

1. Background Field

The present invention relates generally to generating databases of access points for use with localization and more particular, to improving the accuracy of estimated locations of access points in databases.

2. Relevant Background

Access point databases provide a useful resource for localization, particularly in areas where satellite signals for positioning are scarce, e.g., when indoors or in urban canyons, or when a fast time-to-first fix is desired. Access points are wireless devices through which networks may be accessed by mobile devices or other wireless devices. Mobile devices can detect one or more access points in their proximity and refer to the access point database to estimate a position of the mobile device.

Typically, the positions of access points in access point databases are not very precise, which adversely effects the estimated position of mobile devices when relying on the access point database. For example, many access point databases are generated through wardriving or crowdsourcing in which wireless signals from an access point are measured at a plurality of known positions. Using the wireless signal measurements and the associated position fixes of the measuring device, the position of the access point may be estimated. The position fixes of the measuring device associated with the wireless signal measurements are typically generated using, e.g., satellite positioning signals (SPS), such as the Global Positioning System (GPS). Consequently, the resulting estimated positions for the access points are often determined to be in locations where SPS position fixes are available, e.g., in outdoor locations. In turn, when relying on the access point database for localization, the estimated position of a mobile device is often determined to be in an outdoor location. Thus, it is desirable to improve the accuracy of access point databases.

SUMMARY

An estimated location of an access point is generated based on identification of indoor and outdoor locations and the presumption that most access points are in an indoor location. The estimated location may be produced using location information for the access point and the identification of the indoor and outdoor locations while prioritizing the indoor location to produce the estimated location on or within a boundary of the indoor location. The location information may be, e.g., a preliminary estimated location or wireless signal measurements and associated position fixes for the access point. For example, a preliminary estimated location may be shifted to be on or within the nearest boundary of an indoor location or may be adjusted based on the location information. The estimated location may be calculated directly using weights to bias the calculation of the estimated location to be on or within the boundary of the indoor location.

In one implementation, a method includes receiving location information associated with an access point located in an area; and producing an estimated location of the access point using the location information and an identification of an indoor location and an outdoor location for the area while prioritizing the indoor location to produce the estimated location on or within a boundary of the indoor location.

In one implementation, an apparatus includes an external interface; and a processor coupled to the external interface to receive location information associated with an access point located in an area, the processor configured to produce an estimated location of the access point using the location information and the identification of an indoor location and an outdoor location for the area while prioritizing the indoor location to produce the estimated location on or within a boundary of the indoor location.

In one implementation, an apparatus includes means for receiving location information associated with an access point located in an area; and means for producing an estimated location of the access point using the location information and an identification of an indoor location and an outdoor location for the area while prioritizing the indoor location to produce the estimated location on or within a boundary of the indoor location.

In one implementation, a computer-readable medium including program code stored thereon, includes program code to receive location information associated with an access point located in an area; and program code to produce an estimated location of the access point using the location information and an identification of an indoor location and an outdoor location for the area while prioritizing the indoor location to produce the estimated location on or within a boundary of the indoor location.

DETAILED DESCRIPTION

Figure 1:
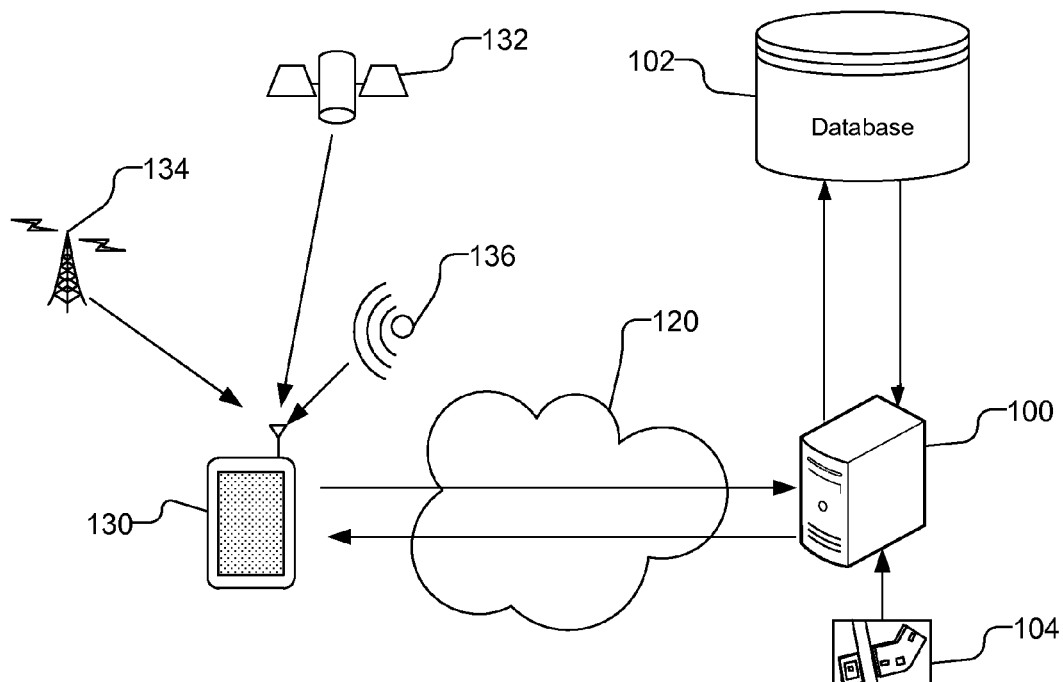
FIG. 1 illustrates a block diagram showing a system in which an access point database, e.g., for localization of mobile devices, may be enhanced to provide a more accurate estimate of location of the access points.

FIG. 1 illustrates a block diagram showing a system in which an access point database 102, e.g., for localization of mobile devices, may be enhanced to provide a more accurate estimate of location of the access points. As illustrated in FIG. 1, the access point database 102 is coupled to a server 100 that is configured to provide an estimated location for access points while prioritizing indoor locations to produce the estimated location on or within a boundary of the indoor location.

The server 100 may receive location information associated with one or more access points in the form of, e.g., a pre-generated database of access points, which may be conventionally generated, e.g., using war-driving or crowdsourcing. A pre-generated database may be received from a remote source, e.g., from a third party, or received from a local source, e.g., from the server 100 itself or from other networked servers. The location information associated with access points provided by the pre-generated database may include the identities and estimated locations of the access points. If desired, the location information in the pre-generated database may further include information such as wireless signal measurements from an access point obtained using one or more mobile devices, along with the position fixes of the mobile devices while measuring the wireless signals which were used to derive the estimated locations of the access points. By way of example, wireless signal measurements may include received signal strength indication (RSSI) and/or signal travel time.

Typically, however, conventionally generated databases of access points are imprecise with respect to the estimated location of the access points. The lack of precision is often due to the manner in which data is collected. For example, often war-driving or crowdsourcing is used to collect data, but these methods are limited generally to locations reliable position fixes may be obtained, i.e., where satellite based positioning is available, which is typically outdoors. Accordingly, the estimated positions of access points produced using such data collection methods are often based on wireless signal measurements and associated outdoor position fixes, and consequently, the calculated positions of the access points are often incorrectly estimated to be in outdoor locations. The server 100 may improve the estimated positions of the access points by prioritizing indoor locations so that the estimated location of the access point is on or within a boundary of indoor locations.

Alternatively, instead of a pre-generated access point database, the location information may be wireless signal measurements and associated position fixes from one or more mobile devices 130, e.g., obtained by crowdsourcing or war-driving, with which the server 100 can generate a position estimate of the access point. Thus, the server 100 may generate the access point database 102 using received position fixes and wireless signal measurements received from one or more mobile devices 130 and using the techniques described herein.

The mobile device 130 is capable of determining a position fix using conventional positioning techniques, such as a measurement using a satellite positioning system (SPS) 132 or, e.g., trilateration using wireless sources such as cellular towers 134, which are typically used for outside position determination. An SPS system 132 of transmitters is positioned in Earth's orbit to enable entities to determine their location on or above the Earth based, at least in part, on signals received from the transmitters. In a particular example, such transmitters may be located on Earth orbiting satellite vehicles (SVs), e.g., in a constellation of Global Navigation Satellite System (GNSS) such as Global Positioning System (GPS), Galileo, Glonass or Compass or other non-global systems. Thus, as used herein an SPS may include any combination of one or more global and/or regional navigation satellite systems and/ or augmentation systems, and SPS signals may include SPS, SPS-like, and/or other signals associated with such one or more SPS, as well as assisted GPS (A-GPS).

The mobile device 130 is further capable of receiving wireless signals from access points 136, e.g., which may be used for wireless local area network (WLAN) and may be WiFi transmission according to IEEE 802.11 standards or any other wireless standards. The mobile device 130 may measure various parameters of the wireless signals from access points 136, such as the RSSI and/or signal travel time. The mobile device 130 may provide the wireless signal measurements along with the associated position fix of the mobile device 130 to the server 100, e.g., through network 120 or a wired or direction connection with the server 100.

The mobile device 130 further may be capable of utilizing the access point database 102 via network 120 and wireless signals from multiple access points 136 for positioning when in locations where an SPS position fix is difficult or not possible, e.g., when indoors or in an urban canyon. For example, the mobile device 130 may query the access point database 102 to acquire the estimated locations of the access points 136, which are used along with parameters of the wireless signals received from the access point 136, e.g., RSSI and and/or signal travel time, to estimate a current position of the mobile device 130.

As used herein, a "mobile device" refers to any portable electronic device such as a cellular or other wireless communication device, personal communication system (PCS) device, personal navigation device (PND), Personal Information Manager (PIM), Personal Digital Assistant (PDA), or other suitable mobile device. The mobile device may be capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all electronic devices, including wireless communication devices, computers, laptops, tablet computers, etc. capable of generating a position fix, e.g., using a SPS 132 or cellular towers 134, while capturing and measuring signals from access points 136.

As discussed above, databases of access points are often produced using position fixes for mobile devices obtained from SPS systems. The use of SPS based position fixes to generate an access point database is to be expected, as a reliable position fix of the mobile device when measuring the wireless signals from the access points is necessary. Unfortunately, the great majority of access points are located within buildings, i.e., indoors, such as inside offices, stores, malls, hospitals, airports, etc, where SPS based positioning is generally not available. As SPS based position fixes are generally obtainable only when a view of the sky is possible, e.g., outside locations, the use of SPS based position fixes to estimate the locations of access points often results in an incorrect outdoor location estimate for access points. Consequently, when a mobile device uses a conventionally produced database of access points, the mobile device may incorrectly estimate its location.

Based on the knowledge that the great majority of access points are located within buildings, the server 100 may produce more accurate access point databases. Thus, as illustrated in FIG. 1, the server 100 receives data 104 identifying indoor locations and outdoor locations for an area, e.g., as a map database that includes buildings (indoor locations) or as a database of locations associated with good SPS position fixes (indicating outdoor locations) or poor SPS position fixes (indicating indoor locations). Using the received location information for access points along with the identification of indoor locations and outdoor locations, the server 100 may produce an estimated location for access points while prioritizing the indoor locations so that the estimated location is on or within a boundary of the indoor locations.

Figure 2:
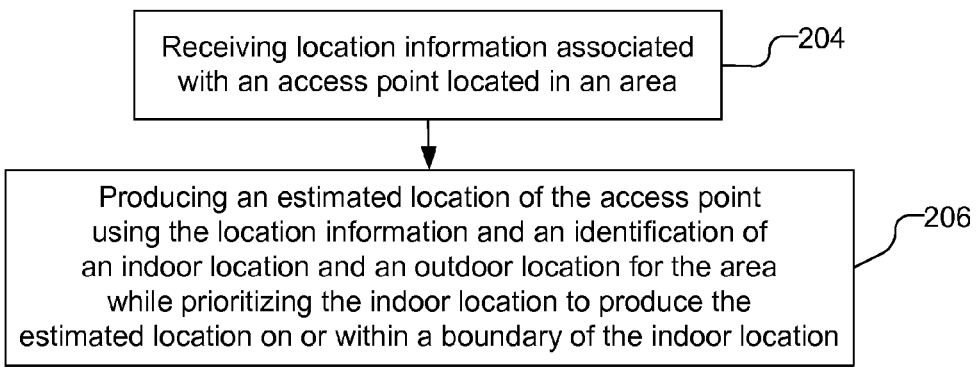
FIG. 2 is a flow chart illustrating a method in which location information for access points is used, along with knowledge of indoor locations and outdoor locations, to generate estimated locations of access points while prioritizing indoor locations to produce the estimated location on or within a boundary of indoor locations.
Figure 3:
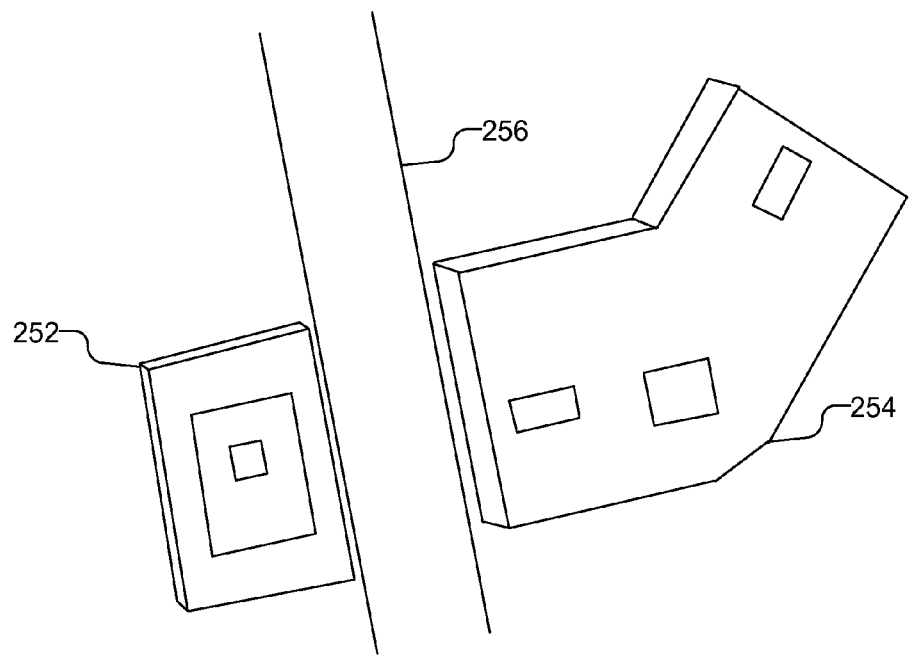
FIG. 3 illustrates a top view of indoor locations as well as the surrounding outdoor locations in an area that may be provided by way of a map database.
Figure 4:
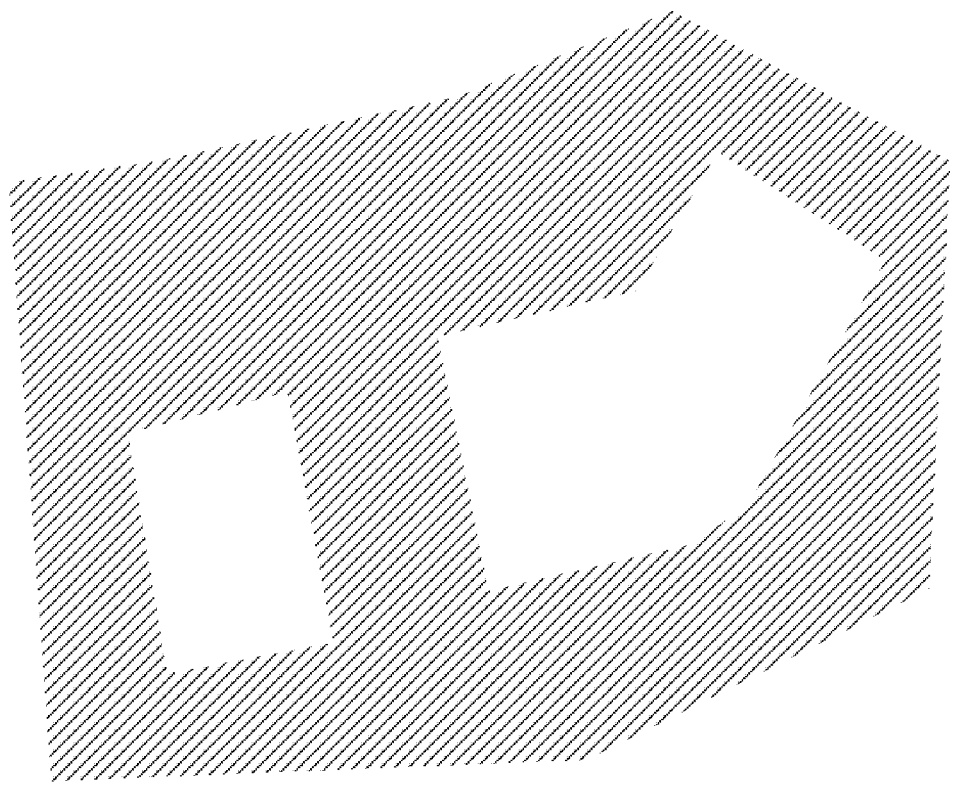
FIG. 4 illustrates the same area illustrated in FIG. 3, but illustrates areas having good SPS position fixes (and thus most likely outdoor locations) using shading and illustrates areas having poor SPS position fixes (and thus most likely indoor locations) without shading.

FIG. 2, by way of example, is a flow chart illustrating a method in which location information for access points in an area is used, along with an identification of indoor locations and outdoor locations in the area, to generate an estimated location of the access points that are on the boundary or within the boundary of indoor locations. The method may, but does necessarily, include the server 100 acquiring identification of an indoor location and an outdoor location for an area. The identification of the indoor location and the outdoor location may be acquired, e.g., by receiving a map database that identifies indoor locations, such as buildings. For example, a map database, such as that provided by Google or Navteq, may be used. FIG. 3, by way of example, illustrates a top view of indoor locations 252 and 254, as well as the surrounding outdoor locations including a road 256 in an area that may be provided by way of a map database. Thus, the indoor locations 252 and 254 and the surrounding outdoor locations in an area may be received by the server 100 by a map database. Alternatively, the identification of the indoor location and the outdoor location may be acquired, e.g., by identifying locations within the area that are associated with good SPS position fixes (indicating outdoor locations) or poor SPS position fixes (indicating indoor locations). FIG. 4, by way of example, illustrates the same area illustrated in FIG. 3, but illustrates areas having good SPS position fixes (and thus most likely outdoor locations) using shading and illustrates areas having poor SPS position fixes (and thus most likely indoor locations) without shading. The determination of good versus poor SPS position fixes may be determined, e.g., by comparing the uncertainty in SPS position fixes to a threshold. Regions in an area with SPS position fixes with an uncertainty that is less than a threshold may be identified as outdoor locations, while the remaining regions (or areas with poor SPS position fixes) may be identified as indoor locations (corresponding to indoor locations 252 and 254 shown in FIG. 3).

As illustrated in FIG. 2, location information associated with an access point located in the area is received (204) by the server 100. The location information associated with the access point may be, e.g., a plurality of position fixes and associated wireless signal measurements for the access point at each position fix in the plurality of position fixes, for example, obtained from one or more mobile devices through crowdsourcing or war-driving. The location information associated with the access point additionally or alternatively may be a preliminary estimated location of the access point, e.g., received in a database of access points. The preliminary estimated location of the access point is referred to as "preliminary" because the estimated location has not been modified based on the known indoor or outdoor locations in the area. When the location information is provided by a database of access points that includes preliminary estimated locations, the location information may also include the position fixes and associated wireless signal measurements for the access points that were used to determine the preliminary estimated locations. The database of access points with preliminary estimated locations of access points may be received from an external source or may be internally or locally produced, e.g., by server 100 or a network of otherwise associated servers.

An estimated location of the access point may then be produced by the server 100 using the location information and the identification of the indoor location and the outdoor location for the area while prioritizing the indoor location to produce the estimated location on or within a boundary of the indoor location (206) and, if desired, the estimated location of the access point may be is stored, e.g., in database 102. For example, the estimated location of the access point may be produced while prioritizing the indoor location by revising a preliminary estimated location that is in the outdoor location to be on or within the boundary of the indoor location or by calculating the estimated location using weights to bias the calculation of the estimated location to be on or within the boundary of the indoor location.

Figure 5:
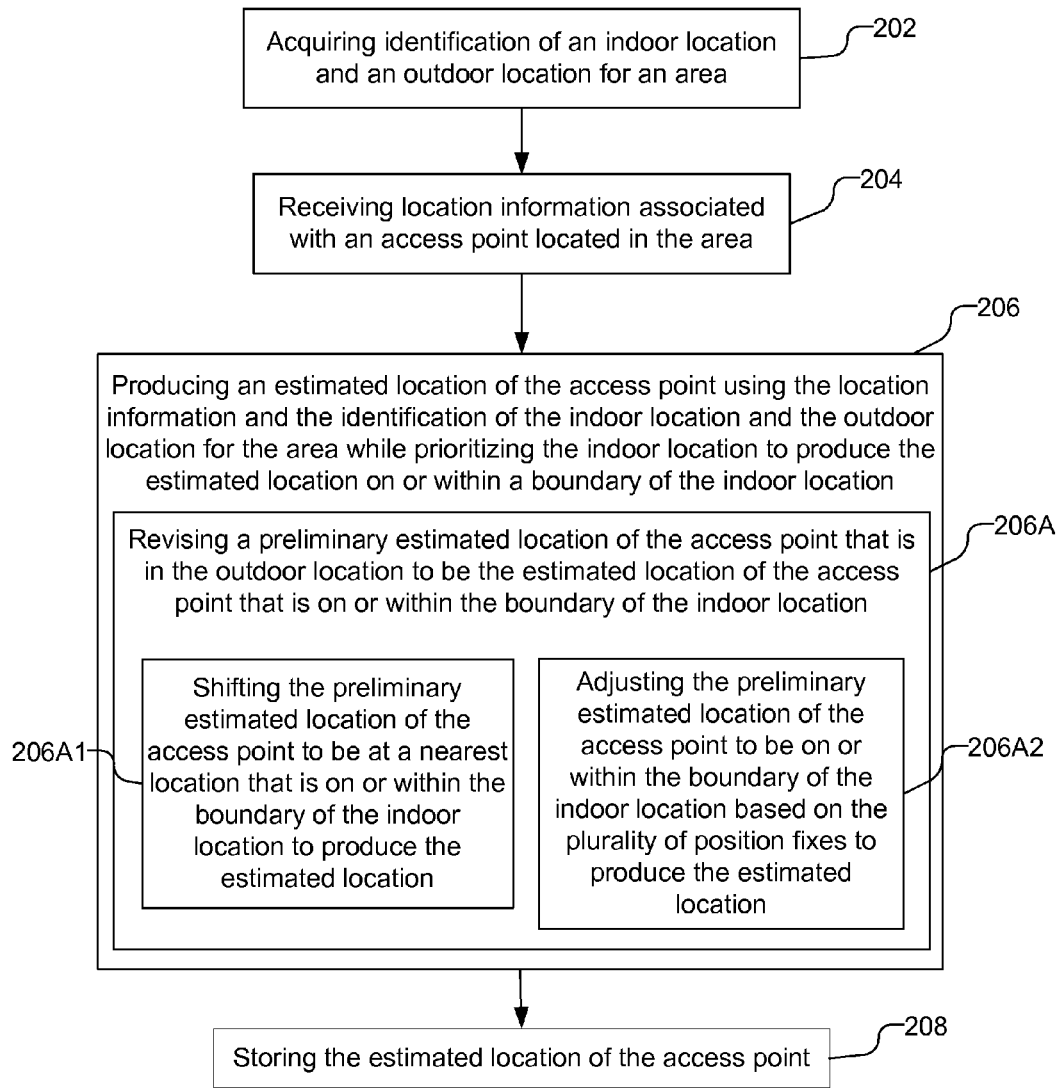
FIG. 5 is a flow chart illustrating a method of generating an estimated location of the access points in which a preliminary estimated location in an outdoor location is revised to produce the estimated location on or within the boundary of an indoor location.

FIG. 5, by way of example, is a flow chart illustrating a method of generating an estimated location of the access points in which a preliminary estimated location in an outdoor location is revised to produce the estimated location on or within the boundary of an indoor location. FIG. 5 is similar to FIG. 2, like designated elements being the same. As illustrated in FIG. 5, the identification of the indoor location and an outdoor location for the area may be acquired (202), e.g., as illustrated in FIG. 3 and FIG. 4. The estimated location of the access point may be produced using the location information and the identification of the indoor location and the outdoor location for the area while prioritizing the indoor location (206) and the estimated location of the access point stored, e.g., in a database (208). As illustrated in FIG. 5, the estimated location of the access point may be produced using the location information and the identification of the indoor location and the outdoor location for the area while prioritizing the indoor location (206) by revising a preliminary estimated location of the access point that is in the outdoor location to be the estimated location of the access point that is on or within the boundary of the indoor location (206A). If desired, the preliminary estimated location of the access point that is in the outdoor location may be calculated using the location information associated with the access point. The preliminary estimated location of the access point may be obtained from a database of access points or may be determined by the server 100 or an associated or networked server using received wireless signal measurement and accompanying position fixes.

Figure 6:
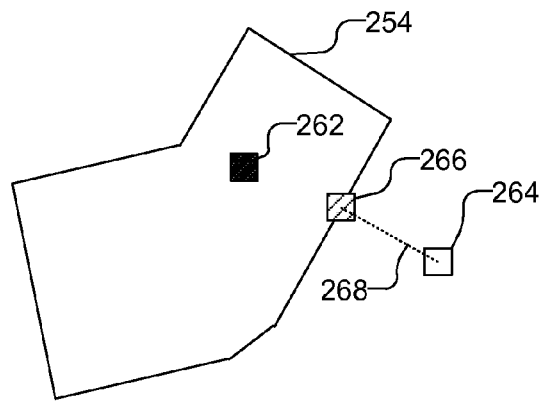
FIG. 6 illustrates a top view of an indoor location and illustrates shifting a preliminary estimated location to be at a nearest location on or within the boundary of the indoor location.

As illustrated in FIG. 5, revising the preliminary estimated location of the access point (206A) may be performed by shifting the preliminary estimated location of the access point to be at a nearest location that is on or within the boundary of the indoor location to produce the estimated location (206A1). By way of example, FIG. 6 illustrates a top view of indoor location 254 and illustrates the actual location 262 of an access point with a solid square and a preliminary estimated location 264 of the access point that is in an outdoor location with an empty square. The preliminary estimated location of the access point may be received, e.g., from a database or calculated by the server 100 or another server. The estimated location 266 of the access point that is on or within the boundary of the indoor location 254 is illustrated by shaded block. As illustrated in FIG. 6, the preliminary estimated location 264 of the access point is revised by shifting the preliminary estimated location 264 of the access point to be at a nearest location on the boundary of the indoor location 254. It should be understood that if desired, the preliminary estimated location 264 may be shifted further to be within the boundary of the indoor location 254. The nearest location of the indoor location 254 may be determined, e.g., based on a geometrical analysis of the indoor location with respect to the preliminary estimated location 264 of the access point. For example, as illustrated in FIG. 6, the nearest location of the indoor location is along a perpendicular line 268 extending from the nearest wall of the indoor location 254 to the preliminary estimated location 264 of the access point. Thus, even though the preliminary estimated location 264 of the access point is in an outdoor location, based on the identification of the indoor location and the fact that most access points are located in an indoor location, the preliminary estimated location 264 is shifted to be on or within the boundary of the indoor location 254 at estimated location 266.

Figure 7:
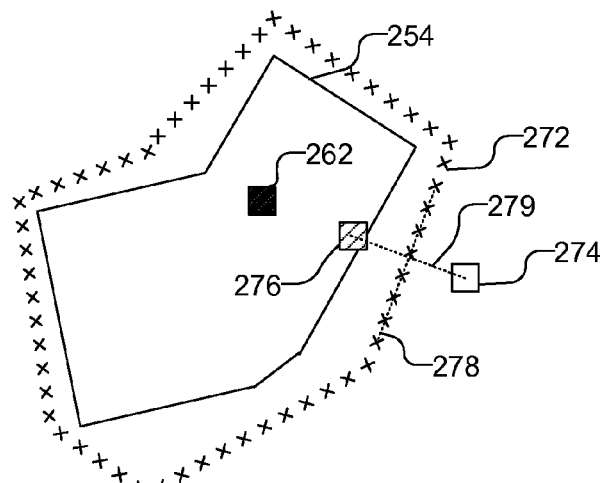
FIG. 7 illustrates another top view of an indoor location and illustrates adjusting a preliminary estimated location based on the plurality of position fixes to be on or within the boundary of the indoor location.

As illustrated in FIG. 5, where the location information associated with the access point includes a plurality of position fixes and associated wireless signal measurements for the access point at each position fix in the plurality of position fixes, e.g., received from one or more mobile devices through crowd sourcing or war driving, the preliminary estimated location may be determined by adjusting the preliminary estimated location of the access point to be on or within the boundary of the indoor location based on the plurality of position fixes to produce the estimated location (206A2). FIG. 7, by way of example, illustrates another top view of indoor location 254, along with the actual location 262 of an access point. Each of a plurality of position fixes 272 for a mobile device corresponding to wireless signals measurements of the access point are illustrated as an "x" around the indoor location 254. Using the position fixes 272 and the associated wireless signal measurements, a preliminary estimated location 274 of the access point may be produced, e.g., by the server 100 or another server, or previously produced and provided by an access point database, illustrated by an empty square in the outdoor location. The preliminary estimated location 274 of the access point may be revised by adjusting it to be on or within the boundary of the indoor location based on the plurality of position fixes 272 to produce the estimated location 276 shown with a shaded square.

For example, when a preliminary estimated location 274 is in an outdoor location, as illustrated in FIG. 7, a line of symmetry 278 may be defined based on a set of the position fixes 272, such as the closest 3 to 10 or more position fixes, used to produce the preliminary estimated location 274. The line of symmetry 278 may then be used to adjust the preliminary estimated location 274 of the access point to be on a side opposite the first side of the line of symmetry 278 and on or within the boundary of the indoor location to produce the estimated location 276. For example, the estimated location 276 of the access point within the boundary of the indoor location 254 may be produced by flipping the preliminary estimated location 274 about the line of symmetry 278, e.g., so that a line 279 between the preliminary estimated location 274 and the estimated location 276 is perpendicular to the line of symmetry 278.

Figure 9:
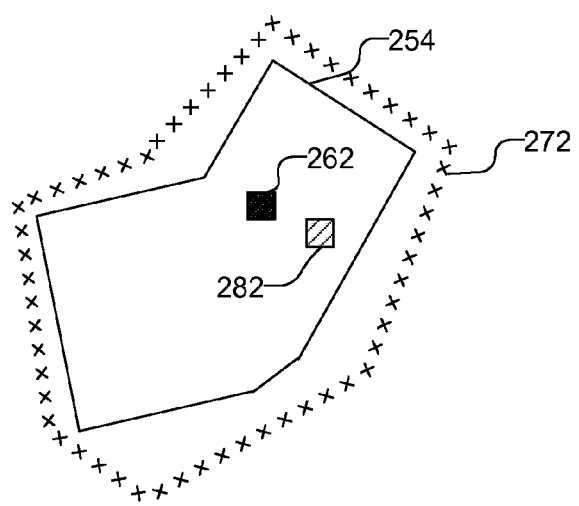
FIG. 9 illustrates another top view of indoor location and illustrates calculating the estimated location of the access point using weights.
Figure 8:
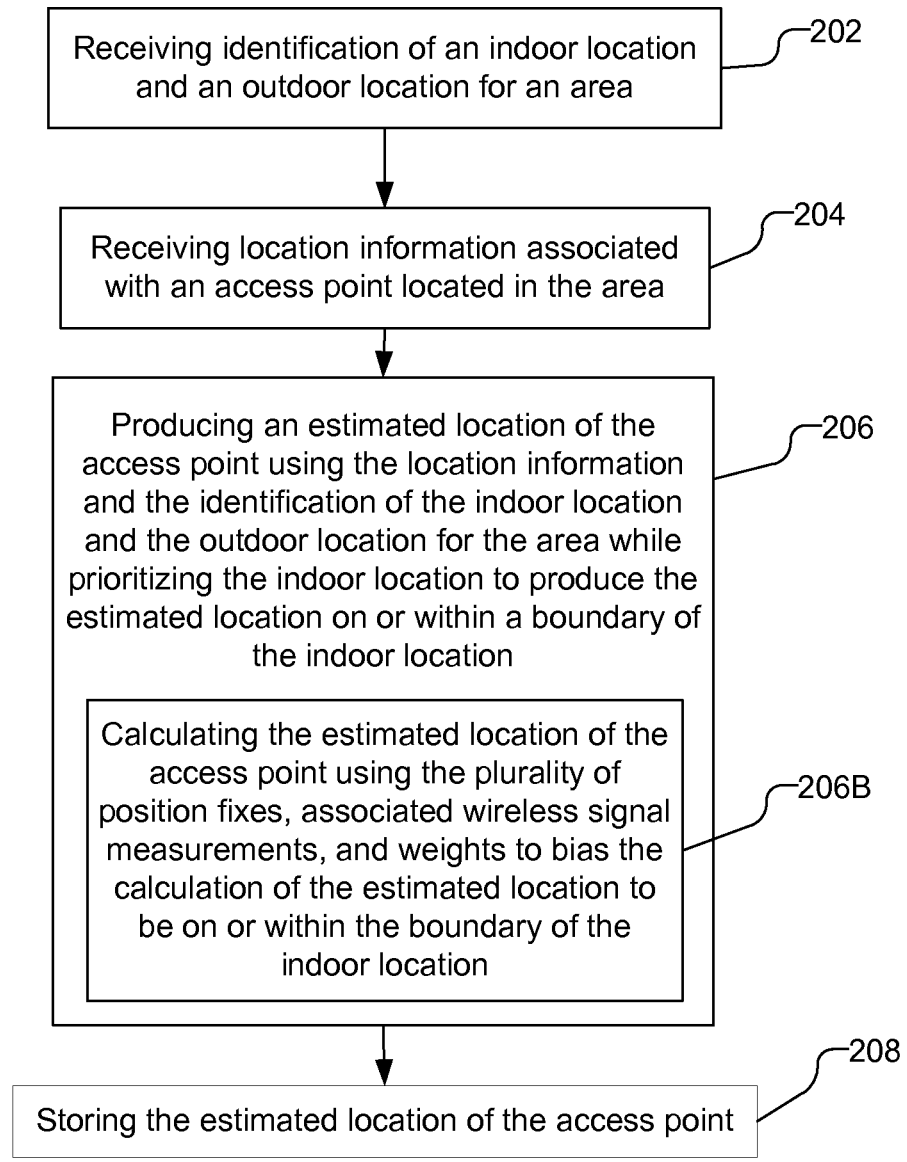
FIG. 8 is a flow chart illustrating a method of generating an estimated location of the access points in which the estimated location of the access point is calculated using weights.

FIG. 8 is a flow chart illustrating a method of generating an estimated location of the access points in which the estimated location of the access point is calculated using weights. FIG. 8 is similar to FIG. 2, like designated elements being the same. As illustrated in FIG. 8, the estimated location of the access point may be produced using the location information and the identification of the indoor location and the outdoor location for the area while prioritizing the indoor location (206) by calculating the estimated location of the access point using the plurality of position fixes, associated wireless signal measurements, and weights to bias the calculation of the estimated location to be on or within the boundary of the indoor location (206B), where the location information associated with the access point is a plurality of position fixes and associated wireless signal measurements for the access point at each position fix in the plurality of position fixes, e.g., received from one or more mobile devices through crowd sourcing or war driving or from a database of access points that includes such information. For example, the estimated location of the access point may be calculated by performing trilateration with weights. The trilateration with weights, for example, may be a convex optimization or a non-convex optimization. The weights may be determined, e.g., based on the identification of the indoor and outdoor location for the area and/or an attribute of the indoor/outdoor locations, e.g., the percentage of access points in the indoor and outdoor locations. By way of example, the percentage of access points in indoor and outdoor locations may be estimated for all regions (e.g., 90% of access points are indoors and 10% of access points are outdoors). If desired, the estimate may be region specific, for example, areas with known outdoor access point deployment may alter the ratio (e.g., 80% of access points are indoors and 20% of access points are outdoors). The weights may be determined based on other factors such as access point traffic. FIG. 9, by way of example, illustrates another top view of indoor location 254, along with the actual location 262 of an access point and a plurality of position fixes 272 for a mobile device while measuring the wireless signals from the access point, illustrated as "x"s. Using, e.g., trilateration with weights, the estimated location 282 is calculated to be on or within the boundary of the indoor location 254.

By way of example, using the received location information (e.g., RSSI or RTT information) for an access point in a specific area, without knowledge of indoor/outdoor locations, may result in an estimated location with a 70% probability of being in location 1, and a 30% probability of being in location 2. Thus, without knowledge of the indoor/outdoor locations in this specific area, the access point may be assumed to be in location 1. With knowledge of the indoor/outdoor locations in this specific area, it may be known that location 1 is outdoors and location 2 is indoors and, moreover, it may be estimated that in this specific area, 90% of access points are indoors and 10% are outdoors (e.g. on light poles or other public installations). Accordingly, because location 1 is an outdoor location, location 1 may be weighted by 0.1 (e.g., 70%×0.1=7%); and because location 2 is an indoor location, location 2 may be weighted by 0.9 (e.g., 30%×0.9=27%). Accordingly, with knowledge of the indoor/outdoor locations in this specific area and appropriate weighting, the access point may be assumed to be in location 2.

Thus, as illustrated in FIGS. 6, 7, and 9, the estimated location of the access point may be produced that is on or within a boundary of the indoor location using the location information and the identification of the indoor location and the outdoor location for the area. While the resulting estimated location of the access point may not precisely correspond to the actual location of the access point, using the identification of the indoor location and the outdoor location results in an estimated location that is closer to the actual location than preliminary estimated locations 264 and 274, which are in outdoor locations. Consequently, the estimated location for the access point is improved with respect to conventionally derived estimated locations.

Figure 10:
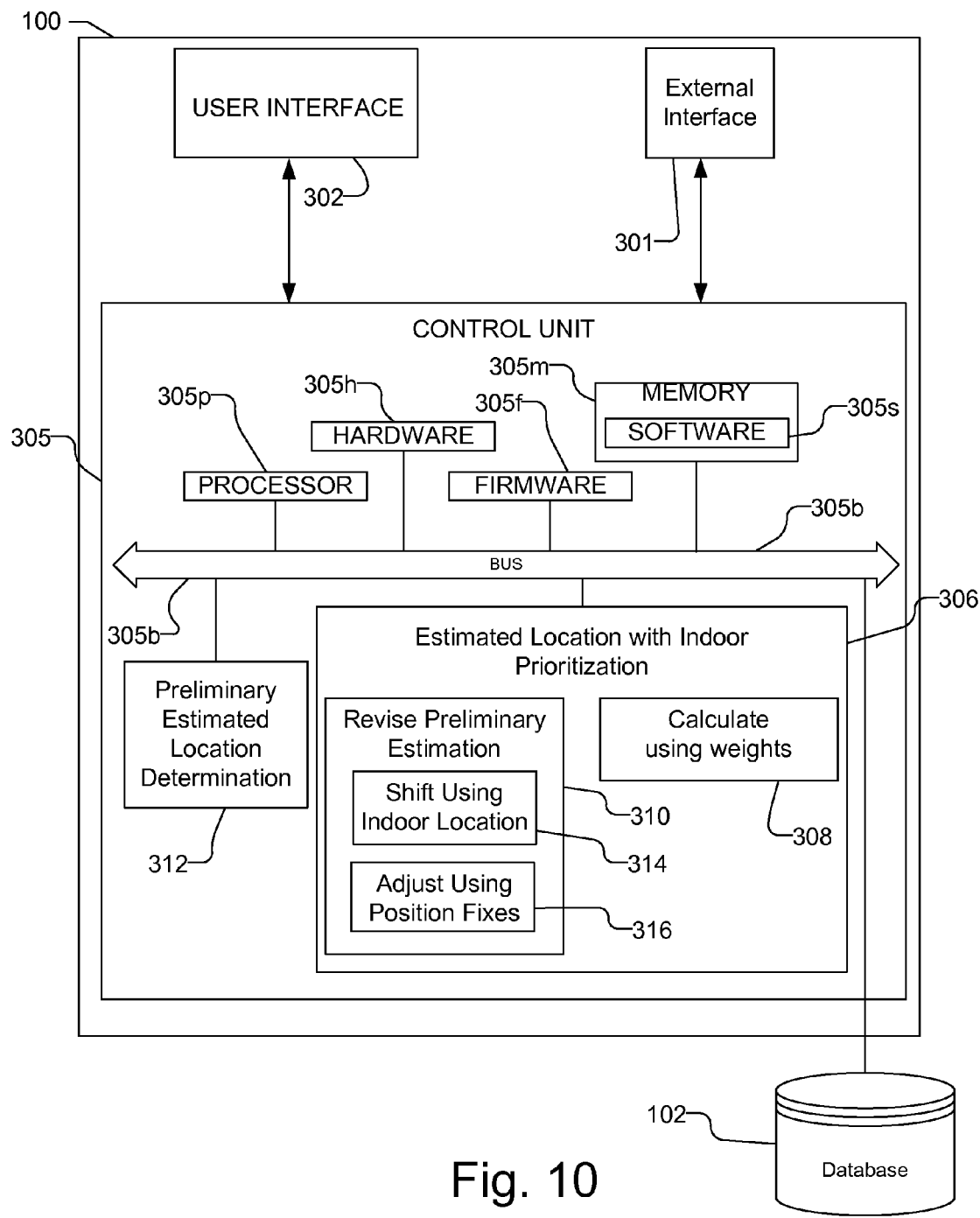
FIG. 10 is a block diagram of a server capable of using location information for access points along with knowledge of indoor locations and outdoor locations to produce an estimated location of an access point while prioritizing the indoor location so that the estimated location is on or within a boundary of the indoor location.

FIG. 10 is a block diagram of server 100 capable of using location information for access points along with knowledge of indoor locations and outdoor locations to produce an estimated location of an access point while prioritizing the indoor location so that the estimated location is on or within a boundary of the indoor location. As illustrated, the server 100 includes an external interface 301 with which the server 100 may acquire identification of an indoor location and an outdoor location in an area as discussed above. The external interface 301 may further communicate with external devices to receive location information for access points, e.g., as a database of access points with preliminary estimated locations or as a plurality of position fixes and associated wireless signal measurements for the access point at each position fix in the plurality of position fixes from one or more mobile devices. The server 100 includes additional elements, such as a user interface 302 that may include e.g., a keypad or other input device through which the user can control the server 100, as well as a display if desired.

The external interface 301, by way of example, may be an interface with one or more of any various wired or wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The server 100 also includes a control unit 305 that is connected to and communicates with the external interface 301, e.g., to receive location information associated with an access point located in the area and to acquire the identification of the indoor location and the outdoor location for an area. The control unit 305 may be provided by a bus 305$b$, processor 305$p$ and associated memory 305$m$, hardware 305$h$, firmware 305$f$, and software 305$s$. The control unit 305 includes an estimated location with indoor prioritization module 306 that produces the estimated location of the access point while prioritizing the indoor location so that the estimated location is on or within a boundary of the indoor location. The estimated location with indoor prioritization module 306 may include a calculate using weights module 308, which may calculate the estimated location of the access point using a plurality of position fixes and associated wireless signal measurements received from a database or one or mobile devices with the external interface 301 and weights to bias the estimated location to be on or within the boundary of the indoor location as discussed in reference to FIGS. 8 and 9, e.g., using trilateration with weights, which may be performed as a convex optimization or non-convex optimization. In another implementation, the estimated location with indoor prioritization module 306 may include a revise preliminary estimation module 310, which receives a preliminary estimation of the location of the access points, e.g., from the preliminary estimated location determination module 312 or from a database received from external interface 301, and revises the preliminary estimation is in the outdoor location to produce the estimated location that is on or within the boundary of the indoor location, as discussed in reference to FIG. 5. The revise preliminary estimation module 310 may include a shift using indoor location module 314, which may move the preliminary estimated location of the access point to be at a nearest location that is on or within the boundary of the indoor location, as discussed in reference to FIGS. 5 and 6. In another implementation, the revise preliminary estimation module 310 may include an adjust using position fixes module 316, which may adjust the preliminary estimated location to be on or within the boundary of the indoor location based on a plurality of position fixes received with the external interface 301, as discussed in reference to FIGS. 5 and 7. The control unit 305 causes the produced estimated location of the access point to be stored in memory 305$m$ and/or the access point database 102, e.g., via bus 105$b$.

The various modules 306, 308, 310, 312, 314, and 316 are illustrated separately from processor 305$p$ for clarity, but may be part of the processor 305$p$ or implemented in the processor based on instructions in the software 305$s$ which is run in the processor 305$p$. It will be understood as used herein that the processor 305$p$ can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 305$h$, firmware 305$f$, software 305$s$, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 305$m$ and executed by the processor 305$p$. Memory 305$m$ may be implemented within or external to the processor 305$p$. If implemented in firmware and/or software, the functions may be stored as one or more instructions or code on a computer-readable medium.

Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, the server 100 may include a means for receiving location information associated with an access point located in an area, which may be, e.g., the external interface 301. A means for producing an estimated location of the access point using the location information and an identification of an indoor location and an outdoor location for the area while prioritizing the indoor location to produce the estimated location on or within a boundary of the indoor location may be, e.g., estimated location with indoor prioritization module 306. The means for producing the estimated location of the access point may comprise, e.g., a means for revising a preliminary estimated location of the access point that is in the outdoor location to be the estimated location of the access point that is on or within the boundary of the indoor location, which may be, e.g., the revise preliminary estimation module 310. The means for revising the preliminary estimated location of the access point may comprise a means for shifting the preliminary estimated location of the access point to be at a nearest location that is on or within the boundary of the indoor location to produce the estimated location, which may be, e.g., the shift using indoor location module 314. The means for revising the preliminary estimated location of the access point may comprise a means for adjusting the preliminary estimated location of the access point to be on or within the boundary of the indoor location based on the plurality of position fixes to produce the estimated location, which may be, e.g., the adjust using position fixes module 316. In another implementation, the means for producing the estimated location of the access point may comprise, e.g., a means for calculating the estimated location of the access point using the plurality of position fixes, associated wireless signal measurements, and weights to bias the calculation of the estimated location to be on or within the boundary of the indoor location, which may be the calculate using weights module 308. The server 100 may also include a means for acquiring identification of an indoor location and an outdoor location for an area, which may be, e.g., the external interface 301, and a means for storing the estimated location of the access point may be, e.g., the control unit 305, bus 305*b*, and memory 305*m* and/or database 102.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   receiving location information associated with an access point located in an area;
   acquiring an identification of an indoor location and an outdoor location for the area; and
   producing an estimated location of the access point using the location information and the acquired identification of the indoor location and the outdoor location for the area while prioritizing the indoor location to produce the estimated location on or within a boundary of the indoor location.

2. The method of claim 1, wherein producing the estimated location of the access point using the location information and the identification of the indoor location and the outdoor location for the area while prioritizing the indoor location to produce the estimated location on or within the boundary of the indoor location comprises:
   revising a preliminary estimated location of the access point that is in the outdoor location to be the estimated location of the access point that is on or within the boundary of the indoor location.

3. The method of claim 2, further comprising calculating the preliminary estimated location of the access point that is in the outdoor location using the location information associated with the access point.

4. The method of claim 2, wherein revising the preliminary estimated location of the access point comprises shifting the preliminary estimated location of the access point to be at a nearest location that is on or within the boundary of the indoor location to produce the estimated location.

5. The method of claim 2, wherein the location information associated with the access point comprises:
   a plurality of position fixes and associated wireless signal measurements for the access point at each position fix in the plurality of position fixes;
   wherein revising the preliminary estimated location of the access point comprises:
   adjusting the preliminary estimated location of the access point to be on or within the boundary of the indoor location based on the plurality of position fixes to produce the estimated location.

6. The method of claim 5, wherein adjusting the preliminary estimated location of the access point to be on or within the boundary of the indoor location based on the plurality of position fixes comprises:
   defining a line of symmetry based on a set of position fixes from the plurality of position fixes, wherein the preliminary estimated location is on one side of the line of symmetry; and
   shifting the preliminary estimated location of the access point to be on a side opposite the first side of the line of symmetry and on or within the boundary of the indoor location to produce the estimated location.

7. The method of claim 6, wherein a line between the preliminary estimated location and the estimated location is perpendicular to the line of symmetry.

8. The method of claim 1, wherein the location information associated with the access point comprises:
   a plurality of position fixes and associated wireless signal measurements for the access point at each position fix in the plurality of position fixes;
   wherein producing the estimated location of the access point using the location information and the identification of the indoor location and the outdoor location for the area while prioritizing the indoor location to produce the estimated location on or within the boundary of the indoor location comprises:
  calculating the estimated location of the access point using the plurality of position fixes and associated wireless signal measurements, and weights to bias the calculation of the estimated location to be on or within the boundary of the indoor location.

9. The method of claim 8, wherein the weights are based on a percentage of access points in the indoor location and the outdoor location.

10. The method of claim 8, wherein calculating the estimated location of the access point using the plurality of position fixes and associated wireless signal measurements, and the weights to bias the calculation of the estimated location to be on or within the boundary of the indoor location comprises performing trilateration with the weights.

11. The method of claim 10, wherein performing the trilateration with the weights comprises using one of convex optimization or non-convex optimization.

12. The method of claim 1, further comprising acquiring the identification of the indoor location and the outdoor location for the area.

13. The method of claim 1, wherein receiving the location information associated with the access point located in the area comprises receiving a database of access points including preliminary estimated locations of the access points.

14. The method of claim 1, wherein receiving the location information associated with the access point located in the area comprises receiving a plurality of position fixes and associated wireless signal measurements for the access point at each position fix in the plurality of position fixes.

15. An apparatus comprising:
  an external interface; and
  a processor coupled to the external interface to receive location information associated with an access point located in an area, the processor configured to produce an estimated location of the access point using the location information and an identification of an indoor location and an outdoor location for the area while prioritizing the indoor location to produce the estimated location on or within a boundary of the indoor location.

16. The apparatus of claim 15, wherein the processor is configured to produce the estimated location of the access point using the location information and the identification of the indoor location and the outdoor location for the area while prioritizing the indoor location to produce the estimated location on or within the boundary of the indoor location by being configured to:
  revise a preliminary estimated location of the access point that is in the outdoor location to be the estimated location of the access point that is on or within the boundary of the indoor location.

17. The apparatus of claim 16, wherein the processor is further configured to calculate the preliminary estimated location of the access point that is in the outdoor location using the location information associated with the access point.

18. The apparatus of claim 16, wherein the processor is configured to revise the preliminary estimated location of the access point by being configured to shift the preliminary estimated location of the access point to be at a nearest location that is on or within the boundary of the indoor location to produce the estimated location.

19. The apparatus of claim 16, wherein the location information associated with the access point comprises:
  a plurality of position fixes and associated wireless signal measurements for the access point at each position fix in the plurality of position fixes;
  wherein the processor is configured to revise the preliminary estimated location of the access point by being configured to:
    adjust the preliminary estimated location of the access point to be on or within the boundary of the indoor location based on the plurality of position fixes to produce the estimated location.

20. The apparatus of claim 19, wherein the processor is configured to adjust the preliminary estimated location of the access point to be on or within the boundary of the indoor location based on the plurality of position fixes by being configured to:
  define a line of symmetry based on a set of position fixes from the plurality of position fixes, wherein the preliminary estimated location is on one side of the line of symmetry; and
  shift the preliminary estimated location of the access point to be on a side opposite the first side of the line of symmetry and on or within the boundary of the indoor location to produce the estimated location.

21. The apparatus of claim 20, wherein a line between the preliminary estimated location and the estimated location is perpendicular to the line of symmetry.

22. The apparatus of claim 15, wherein the location information associated with the access point comprises:
  a plurality of position fixes and associated wireless signal measurements for the access point at each position fix in the plurality of position fixes;
  wherein the processor is configured to produce the estimated location of the access point using the location information and the identification of the indoor location and the outdoor location for the area while prioritizing the indoor location to produce the estimated location on or within the boundary of the indoor location by being configured to:
    calculate the estimated location of the access point using the plurality of position fixes and associated wireless signal measurements, and weights to bias the calculation of the estimated location to be on or within the boundary of the indoor location.

23. The apparatus of claim 22, wherein the weights are based on a percentage of access points in the indoor location and the outdoor location.

24. The apparatus of claim 22, wherein the processor is configured to calculate the estimated location of the access point using the plurality of position fixes and associated wireless signal measurements, and the weights to bias the calculation of the estimated location to be on or within the boundary of the indoor location by being configured to perform trilateration with weights.

25. The apparatus of claim 24, wherein the processor is configured to perform the trilateration with weights by being configured to use one of convex optimization or non-convex optimization.

26. The apparatus of claim 15, wherein the processor is further configured to acquire the identification of the indoor location and the outdoor location for the area.

27. The apparatus of claim 15, wherein the processor receives the location information associated with the access point located in the area as a database of access points in the area including preliminary estimated locations of the access points.

28. The apparatus of claim 15, wherein the processor receives the location information associated with the access point located in the area a plurality of position fixes and associated wireless signal measurements for the access point at each position fix in the plurality of position fixes.

29. An apparatus comprising:
    means for receiving location information associated with an access point located in an area; and
    means for producing an estimated location of the access point using the location information and an identification of an indoor location and an outdoor location for the area while prioritizing the indoor location to produce the estimated location on or within a boundary of the indoor location.

30. The apparatus of claim 29, wherein the means for producing the estimated location of the access point using the location information and the identification of the indoor location and the outdoor location for the area while prioritizing the indoor location to produce the estimated location on or within the boundary of the indoor location comprises means for revising a preliminary estimated location of the access point that is in the outdoor location to be the estimated location of the access point that is on or within the boundary of the indoor location.

31. The apparatus of claim 30, wherein the means for revising the preliminary estimated location of the access point comprises means for shifting the preliminary estimated location of the access point to be at a nearest location that is on or within the boundary of the indoor location to produce the estimated location.

32. The apparatus of claim 30, wherein the location information associated with the access point comprises:
    a plurality of position fixes and associated wireless signal measurements for the access point at each position fix in the plurality of position fixes;
    wherein the means for revising the preliminary estimated location of the access point comprises:
        means for adjusting the preliminary estimated location of the access point to be on or within the boundary of the indoor location based on the plurality of position fixes to produce the estimated location.

33. The apparatus of claim 29, wherein the location information associated with the access point comprises:
    a plurality of position fixes and associated wireless signal measurements for the access point at each position fix in the plurality of position fixes;
    wherein the means for producing the estimated location of the access point using the location information and the identification of the indoor location and the outdoor location for the area while prioritizing the indoor location to produce the estimated location on or within the boundary of the indoor location comprises:
        means for calculating the estimated location of the access point using the plurality of position fixes and associated wireless signal measurements, and weights to bias the calculation of the estimated location to be on or within the boundary of the indoor location.

34. A non-transitory computer-readable medium including program code stored thereon, comprising:
    program code to receive location information associated with an access point located in an area; and
    program code to produce an estimated location of the access point using the location information and an identification of an indoor location and an outdoor location for the area while prioritizing the indoor location to produce the estimated location on or within a boundary of the indoor location.

35. The non-transitory computer-readable medium of claim 34, wherein the program code to produce the estimated location of the access point using the location information and the identification of the indoor location and the outdoor location for the area while prioritizing the indoor location to produce the estimated location on or within the boundary of the indoor location comprises:
    program code to revise a preliminary estimated location of the access point that is in the outdoor location to be the estimated location of the access point that is on or within the boundary of the indoor location.

36. The non-transitory computer-readable medium of claim 35, wherein the program code to revise the preliminary estimated location of the access point comprises program code to shift the preliminary estimated location of the access point to be at a nearest location that is on or within the boundary of the indoor location to produce the estimated location.

37. The non-transitory computer-readable medium of claim 35, wherein the location information associated with the access point comprises:
    a plurality of position fixes and associated wireless signal measurements for the access point at each position fix in the plurality of position fixes;
    wherein the program code to revise the preliminary estimated location of the access point comprises:
        program code to adjust the preliminary estimated location of the access point to be on or within the boundary of the indoor location based on the plurality of position fixes to produce the estimated location.

38. The non-transitory computer-readable medium of claim 34, wherein the location information associated with the access point comprises:
    a plurality of position fixes and associated wireless signal measurements for the access point at each position fix in the plurality of position fixes;
    wherein the program code to produce the estimated location of the access point using the location information and the identification of the indoor location and the outdoor location for the area while prioritizing the indoor location to produce the estimated location on or within the boundary of the indoor location comprises:
        program code to calculate the estimated location of the access point using the plurality of position fixes and associated wireless signal measurements, and weights to bias the calculation of the estimated location to be on or within the boundary of the indoor location.

* * * * *